(No Model.)

W. W. MINER
METHOD OF MAKING HORSESHOE NAILS.

No. 261,561. Patented July 25, 1882.

WITNESSES.
L. F. Connor.
B. J. Hayes.

INVENTOR.
William W. Miner.
by Crosby & Gregory
Attys

UNITED STATES PATENT OFFICE.

WILLIAM W. MINER, OF BOSTON, MASSACHUSETTS.

METHOD OF MAKING HORSESHOE-NAILS.

SPECIFICATION forming part of Letters Patent No. 261,561, dated July 25, 1882.

Application filed October 17, 1881. (No model.)

*To all whom it may concern:*

Be it known that I, WILLIAM W. MINER, of Boston, county of Suffolk, State of Massachusetts, have invented an Improvement in Animal-Shoe Nails, of which the following description, in connection with the accompanying drawings, is a specification.

This invention has for its object a novel method of manufacturing animal-shoe nails from a rod by a rolling and cutting process, such as will be hereinafter described.

Figure 1:
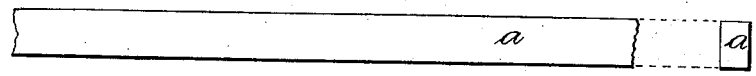
Figure 2:
Figure 3:
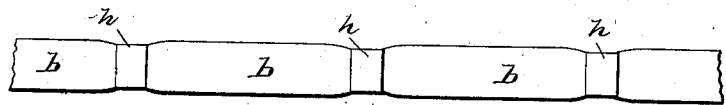
Figure 4:
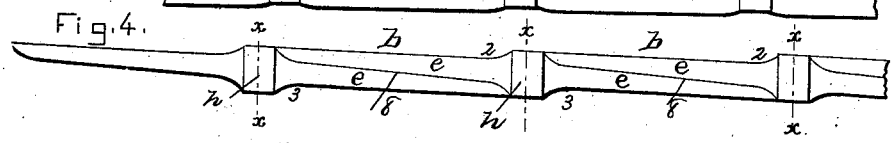
Figure 5:
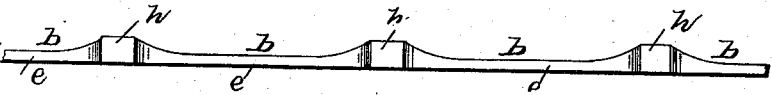
Figure 6:
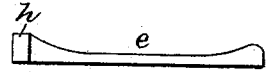
Figure 7:
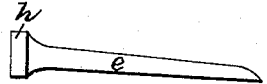
Figure 8:
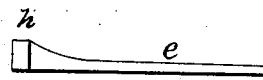
Figure 9:
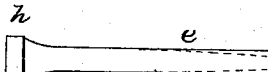
Figure 10:
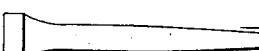
Figure 11:
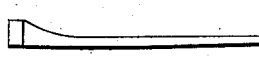

Figure 1 represents in side elevation and section the rod which is to be rolled into shape preparatory to cutting the nail-blank therefrom; Fig. 2, an edge view of the rod rolled partially into shape; Fig. 3, a top view of Fig. 2; Fig. 4, a top view of the rod as it will appear after the second rolling, the dotted lines showing the lines on which the said rod will be cut to form the nail-blanks; Fig. 5, a partial side view of Fig. 4; Figs. 6 and 7, side and top views of one of the nail-blanks cut from the rolled rod shown in Figs. 4 and 5; Figs. 8 and 9, edge and top views of the blank Fig. 7 drawn and stiffened by cold-rolling and provided with a depression containing a bevel for the point; Fig. 10, a top view of the rolled nail and the surplus material removed therefrom by shearing to finish the point of the nail; and Fig. 11 shows the finished nail in side elevation.

In the manufacture of animal-shoe nails in accordance with my present invention I take a nail-rod or narrow strip of iron, $a$, of indefinite length, and after heating it pass it between rolls suitably shaped to draw the said rod and form upon one face a series of depressions, $b$ $b$, which in their formation spread the rod a little laterally, as shown in Fig. 3, leaving portions $h$, of the full size of the rod, to serve for heads. The heads of the blanks $e$ will be formed and cut from the portions $h$ of the rod and their bodies or shanks of the blanks from the depressed or concaved portions $b$. The rod shaped as shown in Fig. 3 is further drawn into the form shown in Fig. 4, where it will be seen that the portions $b$, to form the bodies of two blanks $e$, are forced in next each head part $h$, as at 2 3, Fig. 4, but at opposite sides and edges of the said portions $b$, to thus outline the neck and shank for one half of each blank, the other half of the neck and shank being subsequently formed by a shearing operation. The rod shaped as in Fig. 4 is then placed in a press and cut or sheared on the lines 8, separating the rod between the lines $x$ $x$ into two blanks, $e$, each blank thus having one neck and side formed by a shearing and the other neck and side formed by rolling, producing individual blanks, as shown in Figs. 6 and 7. The blanks $e$, usually with stub toes, are then placed in a machine where they are drawn and stiffened while cold between rollers, one of which has a suitable projection to form a recess, $g$, at one side of the blank, near its end, the edge of the depression nearest the head of the blank (see Fig. 9) being properly beveled or inclined, as at 5, to form the bevel for the point of the finished nail. After this the rolled recessed and beveled blank is placed between a suitable punch and die, substantially such as shown and described in the said patent, which cuts into the recess $g$ of the blank on the dotted line, Fig. 9, and removes from it the surplus metal or fin $h$, as shown at the right of Fig. 10, leaving a nail shaped, hardened, and stiffened in its shank by cold-rolling and provided with a bevel-point, ready for driving.

Between the cutting and cold-rolling operations the blanks may, if desired, be tumbled, to remove from them any fins along their cut sides.

In this my method of manufacture I form the blanks by a rolling and cutting action rather than by a hammer, which is more expensive and wastes more stock than by my proposed plan. By rolling the rod to form the necks and shanks for one part of each blank I am enabled to reduce cost of manufacture and save metal, and my method is, I consider, cheaper than the usual forging previous to the cutting process from a ribbed plate.

I claim—

1. That improvement in the art or method of forming blanks for animal-shoe nails which comprehends rolling a rod to form upon one of its faces the depressions $b$, leaving full portions $h$ at intervals for the heads of the nail-blanks to be cut therefrom, then rolling and drawing the rod and setting or forcing in the sides thereof, as at 2 3 near the portions $h$, and cutting the same into blanks, substantially as described.

2. As an improved article of manufacture, a nail-rod from which to cut animal-shoe-nail blanks, the said rod having formed in it, at one side, a series of concavities or depressions, $b$, between thick head-forming portions $h$, the edges of the rod being forced in at 2 3, near each head-forming portion, to outline one-half the neck and shank of each nail-blank to be cut from the said rod, substantially as described.

In testimony whereof I have signed my name to this specification in the presence of two subscribing witnesses.

WILLIAM W. MINER.

Witnesses:
G. W. GREGORY,
B. J. NOYES.